(12) United States Patent
Stein et al.

(10) Patent No.: US 12,735,051 B2
(45) Date of Patent: Sep. 15, 2026

(54) SYSTEM AND METHOD FOR DETERMINING A CENTER OF GRAVITY OF A TRAILER

(71) Applicant: Torc Robotics, Inc., Blacksburg, VA (US)

(72) Inventors: Fridtjof Stein, Ostfildern (DE); Mario Bijelic, Frankfurt (DE); Florian Kuehnle, Stuttgart (DE); Sebastian Renken, Stuttgart (DE); Nicolai Wengert, Burgstetten (DE)

(73) Assignee: Torc Robotics, Inc., Blacksburg, VA (US)

( * ) Notice: Subject to any disclaimer, the term of this patent is extended or adjusted under 35 U.S.C. 154(b) by 1 day.

(21) Appl. No.: 19/075,432

(22) Filed: Mar. 10, 2025

(65) Prior Publication Data

US 2026/0264698 A1 Sep. 10, 2026

(51) Int. Cl.
*G06F 17/00* (2019.01)
*B60W 40/13* (2012.01)
*B60W 60/00* (2020.01)

(52) U.S. Cl.
CPC .......... *B60W 40/13* (2013.01); *B60W 60/001* (2020.02); *B60W 2040/1315* (2013.01);
(Continued)

(58) Field of Classification Search
CPC ............... B60W 40/13; B60W 60/001; B60W 2040/1315; B60W 2420/408; B60W 2520/18; B60W 2520/22
(Continued)

(56) References Cited

U.S. PATENT DOCUMENTS 6,445,983 B1 9/2002 Dickson et al.
6,873,897 B2 3/2005 Faye et al.
(Continued)

FOREIGN PATENT DOCUMENTS

CN 111051160 B * 5/2023 ............. B60K 28/08
DE 102020007445 A1 2/2021
(Continued)

OTHER PUBLICATIONS

Experimental Evaluation of Roll Stability Control System Effectiveness for A-double Commercial Trucks (Year: 2021).*

*Primary Examiner* — Ronnie M Mancho
(74) *Attorney, Agent, or Firm* — McCarter & English, LLP

(57) ABSTRACT

A system for determining a center of gravity of a trailer is described. The trailer includes a front portion, a rear portion, and a first side and a second side extending between the front and rear portion. The system includes one or more sensors, each having a field-of-view, associated with a vehicle and a processing device in communication with the one or more sensors. The processing device is configured to execute instructions stored in a memory to perform operations. The operations include measuring a plurality of initial points along at least one of the first side and the second side within the field-of-view of the one or more sensors, generating an initial trailer model representative of the plurality of initial points, measuring a plurality of subsequent points along the at least one of the first side and the second side within the field-of-view of the one or more sensors after the plurality of initial points are measured, generating a subsequent trailer model representative of the plurality of subsequent points, assessing the subsequent trailer model and the initial trailer model, determining a roll angle and a kink angle of the trailer based on the assessment of the subsequent trailer
(Continued)

model and the initial trailer model, and determining a center of gravity of the trailer based on the roll angle and the kink angle.

20 Claims, 12 Drawing Sheets

(52) U.S. Cl.
CPC ... *B60W 2420/408* (2024.01); *B60W 2520/18* (2013.01); *B60W 2520/22* (2013.01)

(58) Field of Classification Search
USPC .......................................................... 701/124
See application file for complete search history.

(56) References Cited

U.S. PATENT DOCUMENTS 6,938,716 B1 9/2005 Eull
7,630,796 B2 12/2009 Okada et al.
7,877,884 B2 2/2011 Harrill et al.
8,489,287 B2 7/2013 Hsu et al.
8,659,659 B2 2/2014 Bradai et al.
9,150,198 B2 10/2015 Brueggemann et al.
9,988,787 B1 6/2018 Wang et al.
10,259,390 B2 * 4/2019 Zhang ....................... G06T 7/73
10,266,174 B2 4/2019 Shiraishi et al.
10,502,574 B2 12/2019 Robinson et al.
11,027,804 B2 6/2021 Okaya et al.
11,479,311 B2 10/2022 Doerksen
11,484,775 B2 11/2022 Wood
11,528,856 B2 12/2022 Iyer et al.
11,541,882 B2 1/2023 Albinsson et al.
11,752,882 B1 * 9/2023 Wittenschlaeger .......................... B60L 15/2009 701/22
11,794,724 B2 10/2023 Kuroba et al.
11,840,241 B1 12/2023 Barrett et al.
11,897,469 B2 2/2024 Diessner et al.
12,005,955 B2 6/2024 Helfrich et al.
12,594,805 B2 * 4/2026 Oexl .................... B60G 17/017
2002/0149161 A1 10/2002 Smith
2003/0146829 A1 8/2003 Carlson et al.
2004/0158355 A1 8/2004 Holmqvist et al.
2017/0341583 A1 * 11/2017 Zhang .................... H04N 7/181
2022/0217893 A1 7/2022 Nakamura
2022/0281439 A1 9/2022 Pydin
2022/0404506 A1 12/2022 Hu et al.
2023/0249674 A1 8/2023 Omohundro
2024/0001937 A1 1/2024 Liu
2024/0025268 A1 1/2024 Yoshihara et al.
2025/0353345 A1 * 11/2025 Oexl .................... B60G 17/017
2025/0354884 A1 * 11/2025 Oexl ...................... G01G 19/02
2025/0354885 A1 * 11/2025 Oexl ..................... G01M 1/122

FOREIGN PATENT DOCUMENTS

EP 3324206 A1 5/2018
JP 2003-019984 A 1/2003
JP 4992443 B2 8/2012
JP 2014-227118 A 12/2014
WO 2008/149607 A1 12/2008

* cited by examiner

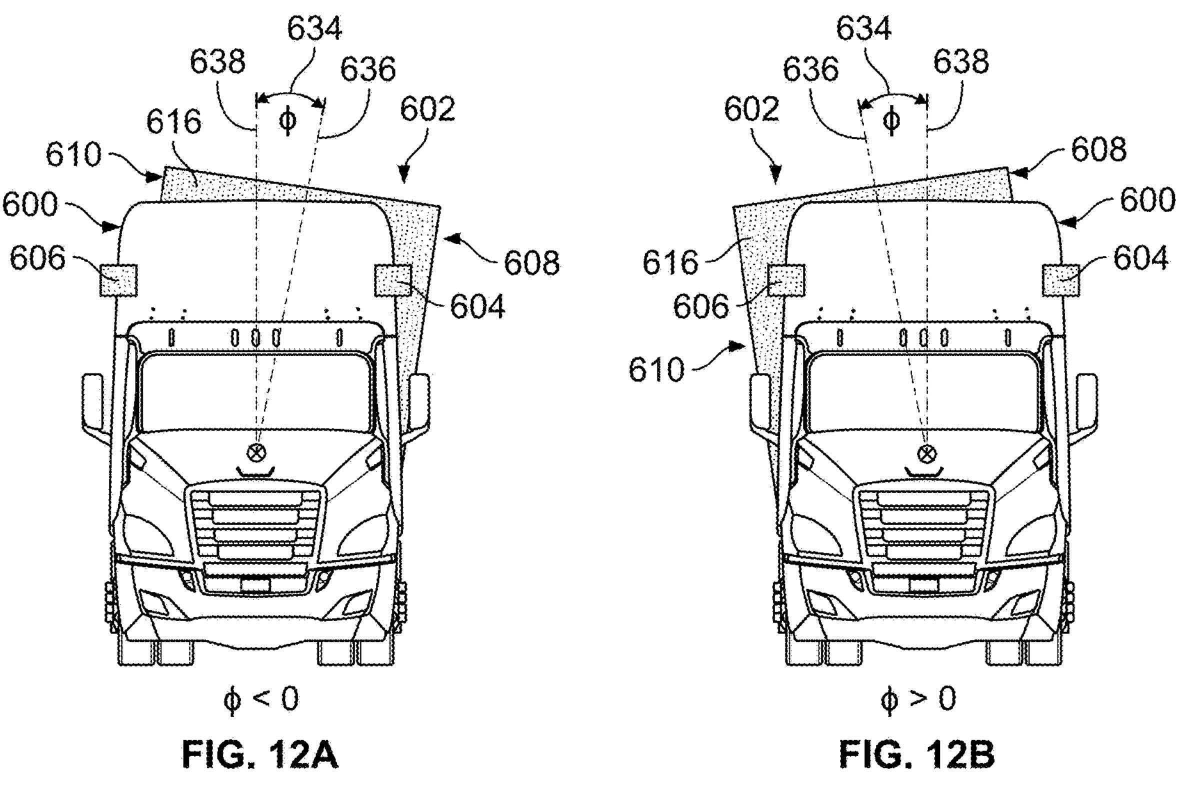
FIG. 12A
FIG. 12B
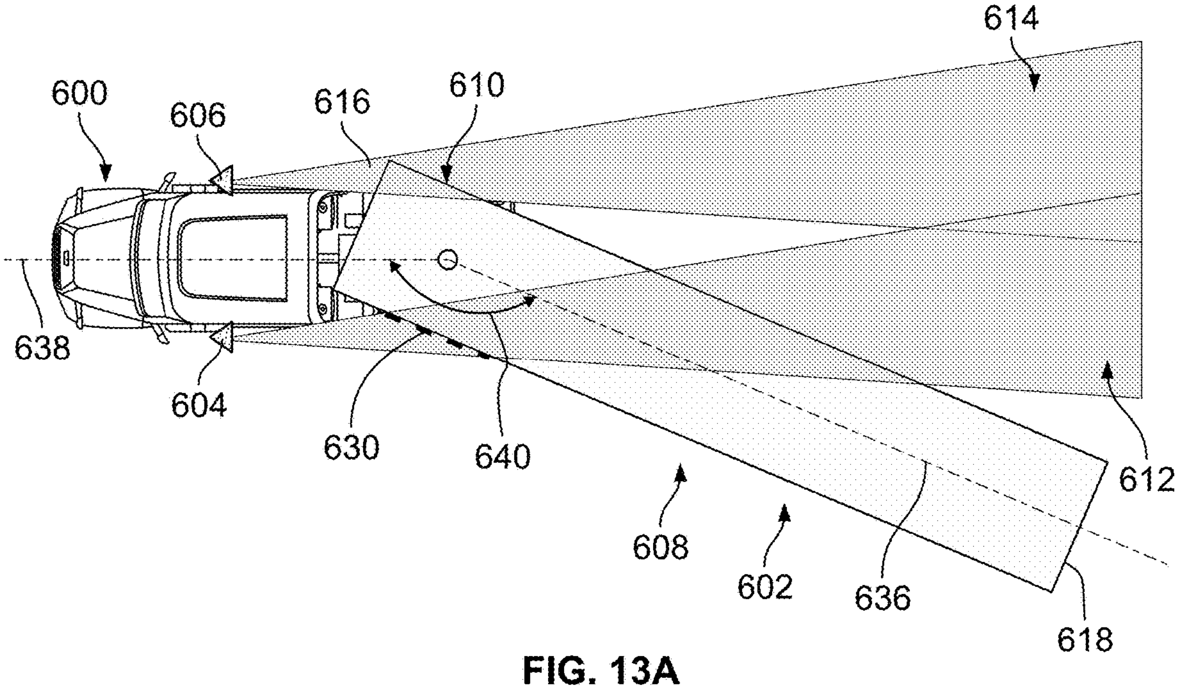
FIG. 13A

SYSTEM AND METHOD FOR DETERMINING A CENTER OF GRAVITY OF A TRAILER

TECHNICAL FIELD

The field of the disclosure relates to determination of a center of gravity of a trailer and, in particular, to a system and method for determining a center of gravity of a trailer coupled to a vehicle to be used in control of the vehicle to prevent accidents involving the trailer during operation of the vehicle and trailer.

BACKGROUND

Autonomous vehicles employ fundamental technologies such as, perception, localization, behaviors and planning, and control. Perception technologies enable an autonomous vehicle to sense and process its environment. Perception technologies process a sensed environment to identify and classify objects, or groups of objects, in the environment, for example, pedestrians, vehicles, or debris. Localization technologies determine, based on the sensed environment, for example, where in the world, or on a map, the autonomous vehicle is. Localization technologies process features in the sensed environment to correlate, or register, those features to known features on a map. Localization technologies may rely on inertial navigation system (INS) data. Behaviors and planning technologies determine how to move through the sensed environment to reach a planned destination. Behaviors and planning technologies process data representing the sensed environment and localization or mapping data to plan maneuvers and routes to reach the planned destination for execution by a controller or a control module. Controller technologies use control theory to determine how to translate desired behaviors and trajectories into actions undertaken by the vehicle through its dynamic mechanical components. This includes steering, braking and acceleration.

In some cases, these autonomous vehicles are coupled to a trailer to autonomously transport and deliver cargo. The lateral and longitudinal control of the autonomous vehicle and the trailer are a significant factor in the safe operation the autonomous vehicle and the trailer. Typically, the lateral and longitudinal control requires the consideration of numerous parameters. Thus, it is important to accurately understand these parameters. In particular, the location and movement of the trailer's center of gravity (COG) plays an important role in maintaining the lateral and longitudinal control for safe operation of the trailer. However, in some cases, the known data related to the trailer (e.g., cargo data, or the like) may not be accurate and/or cargo fixing issues may cause the cargo carried by the trailer to shift during travel and the assumed location and movement of the trailer's COG based on the known data may be inaccurate.

Accordingly, there exists a need for a system and a method for monitoring a trailer coupled to an autonomous vehicle for determining a center of gravity of the trailer that can be used by the autonomous vehicle to maintain stability and control of the trailer and avoid accidents involving the trailer. These and other needs are met by the exemplary system and method for determining a center of gravity of a trailer discussed herein.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY

In one aspect, a system for determining a center of gravity of a trailer is described. The trailer comprises a front portion, a rear portion, and a first side and a second side extending between the front and rear portions. The system comprises one or more sensors associated with a vehicle, each of the one or more sensors having a field-of-view, and a processing device in communication with the one or more sensors. The processing device is configured to execute instructions stored in a memory to perform operations. The operations comprise measuring a plurality of initial points along at least one of the first side and the second side within the field-of-view of the one or more sensors, and generating an initial trailer model representative of the plurality of initial points. After the plurality of initial points are measured, the operations further comprise measuring a plurality of subsequent points along the at least one of the first side and the second side within the field-of-view of the one or more sensors, generating a subsequent trailer model representative of the plurality of subsequent points, assessing the subsequent trailer model and the initial trailer model, determining a roll angle and a kink angle of the trailer based on the assessment of the subsequent trailer model and the initial trailer model, and determining a center of gravity of the trailer based on the roll angle and the kink angle.

In another aspect, a computer-implemented method for determining a center of gravity of a trailer is described. The trailer comprises a front portion, a rear portion, and a first side and a second side extending between the front and rear portions. The method comprises executing instructions stored in a memory with a processing device in communication with the one or more sensors to perform operations. The operations comprise measuring a plurality of initial points along at least one of the first side and the second side within the field-of-view of one or more sensors associated with a vehicle, and generating an initial trailer model representative of the plurality of initial points. After, after the plurality of initial points are measured, measuring a plurality of subsequent points along the at least one of the first side and the second side within the field-of-view of the one or more sensors, generating a subsequent trailer model representative of the plurality of subsequent points, assessing the subsequent trailer model and the initial trailer model, determining a roll angle and a kink angle of the trailer based on the assessment of the subsequent trailer model and the initial trailer model, and determining a center of gravity of the trailer based on the roll angle and the kink angle.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

FIG. 12A is a diagrammatic front view of the vehicle and the trailer of FIG. 9 showing a roll angle for the trailer in a first direction.

FIG. 12B is a diagrammatic front view of the vehicle and the trailer of FIG. 9 showing a roll angle for the trailer in a second direction.

FIG. 13A a diagrammatic top view of a vehicle and trailer, field-of-views of the first and second sensors, and portions of a point cloud for a first side the trailer during a turning action by the vehicle and trailer in a first direction.

Figure 1:
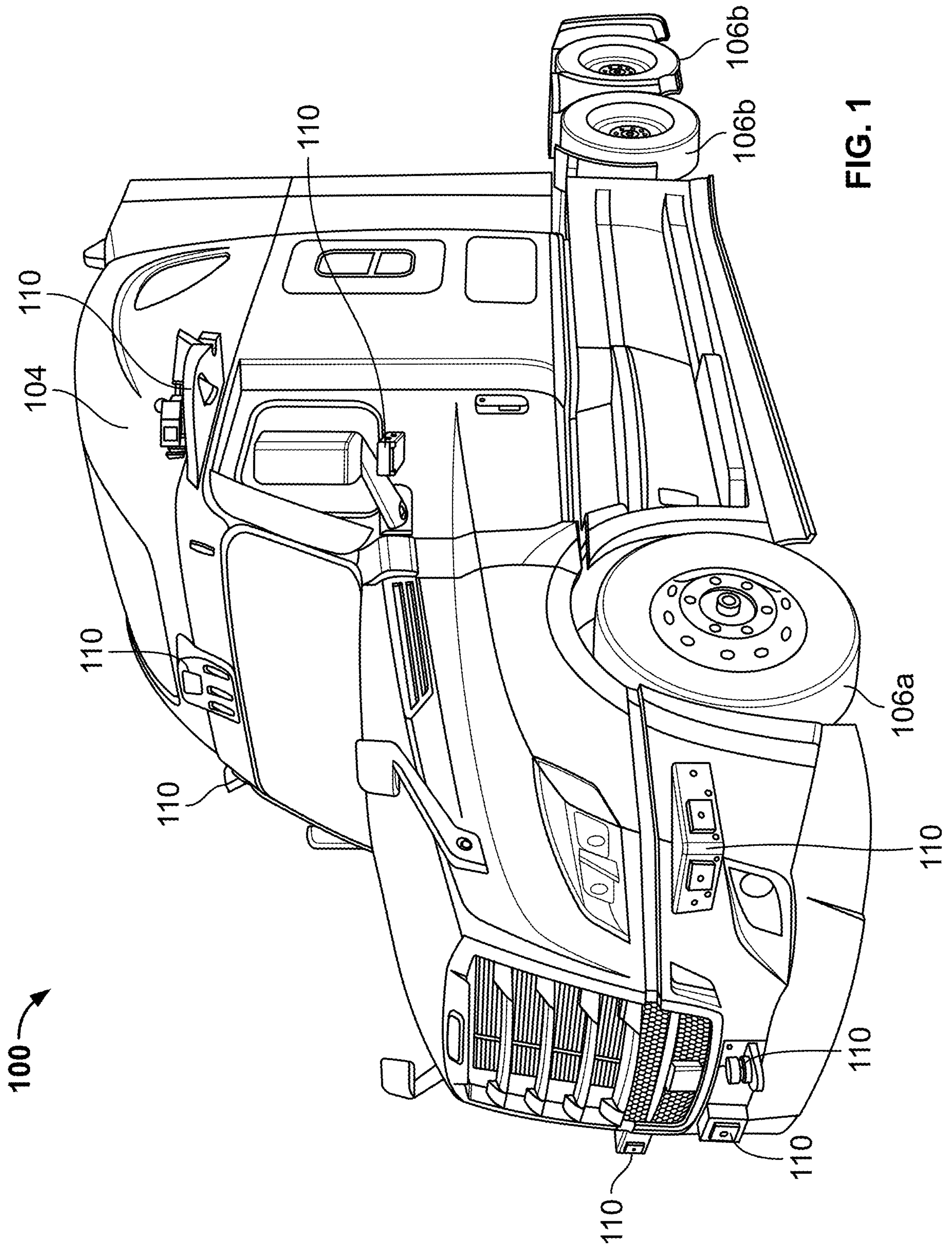
FIG. 1 is a schematic perspective view of an autonomous truck.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure. The following terms are used in the present disclosure as defined below.

An autonomous vehicle: An autonomous vehicle is a vehicle that is able to operate itself to perform various operations such as controlling or regulating acceleration, braking, steering wheel positioning, and so on, without any human intervention. An autonomous vehicle has an autonomy level of level-4 or level-5 recognized by National Highway Traffic Safety Administration (NHTSA).

A semi-autonomous vehicle: A semi-autonomous vehicle is a vehicle that is able to perform some of the driving related operations such as keeping the vehicle in lane and/or parking the vehicle without human intervention. A semi-autonomous vehicle has an autonomy level of level-1, level-2, or level-3 recognized by NHTSA.

A non-autonomous vehicle: A non-autonomous vehicle is a vehicle that is neither an autonomous vehicle nor a semi-autonomous vehicle. A non-autonomous vehicle has an autonomy level of level-0 recognized by NHTSA.

As described herein, the exemplary system and method for determining a center of gravity of a trailer provides an automatic determination of the center of gravity of a trailer based on monitoring of the trailer. The exemplary system ensures that stability and control are maintained to reduce the risk of accidents involving the trailer caused by incorrect cargo data, shifting of the cargo, and/or improper loading of the cargo and as a result ensure the autonomous vehicle, the trailer, and the cargo successfully reach their intended destination.

Despite different trailers being used with the vehicle, the system can be used to automatically determine the center of gravity of any trailer to adjust the vehicle operation parameters and ensure stability and control of the trailer. Trailers having different dimensions, e.g., length, width, or both, can therefore be interchanged based on transportation requirements and the system can monitor any type of trailer using existing sensors positioned on the vehicles.

The exemplary system can use these existing sensors positioned on the vehicles to detect points along at least one side of the trailer and generate a trailer model at different times/events, such as for example, after coupling the trailer to the vehicle, or during operation of the vehicle and trailer on a roadway. The model generated at a first time may be assessed against a model generated at a second time to determine the orientation of the trailer at the second time. The system is able to accurately determine the center of gravity based on the assessment of the different models. The system is able to account for improper loading and/or shifting of the cargo in the determination of the center of gravity to maintain stability and control. The exemplary system also eliminates the need for potentially inaccurate and/or incomplete cargo data, which may result from improper loading and/or shifting of the cargo, in the determination of the center of gravity of the trailer. The center of gravity of the vehicle determined by the system may be used to enhance the stability and control algorithms. The autonomous vehicle can better predict and compensate for changes in dynamics that result from variations in the center of gravity and avoid situations where the trailer may be involved in an accident, such as jackknifing, rollover, or the like.

Various embodiments in the present disclosure are described with reference to FIGS. 1-16 below.

Figure 2:
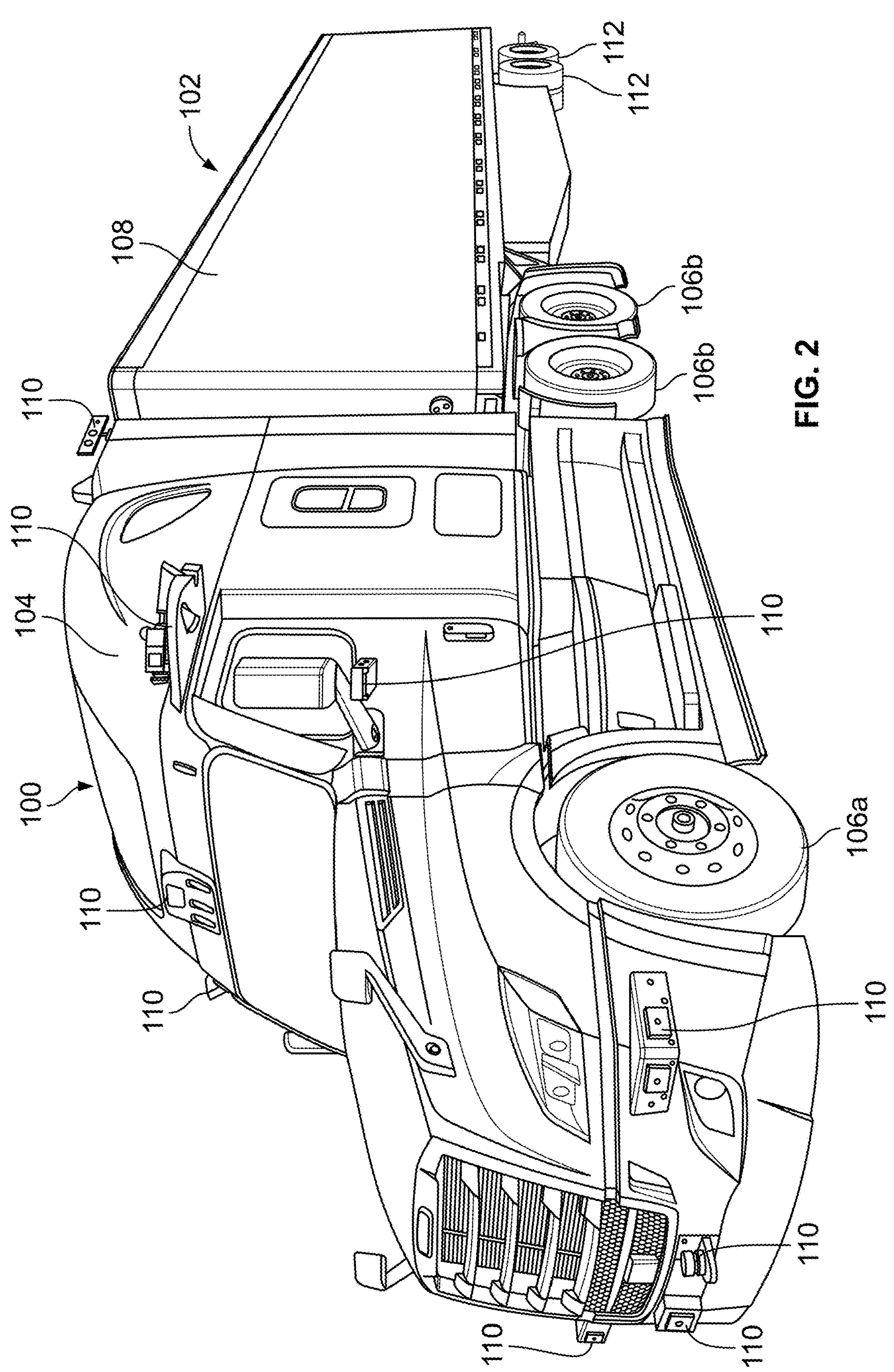
FIG. 2 is a schematic perspective view of an autonomous truck and trailer.
Figure 3:
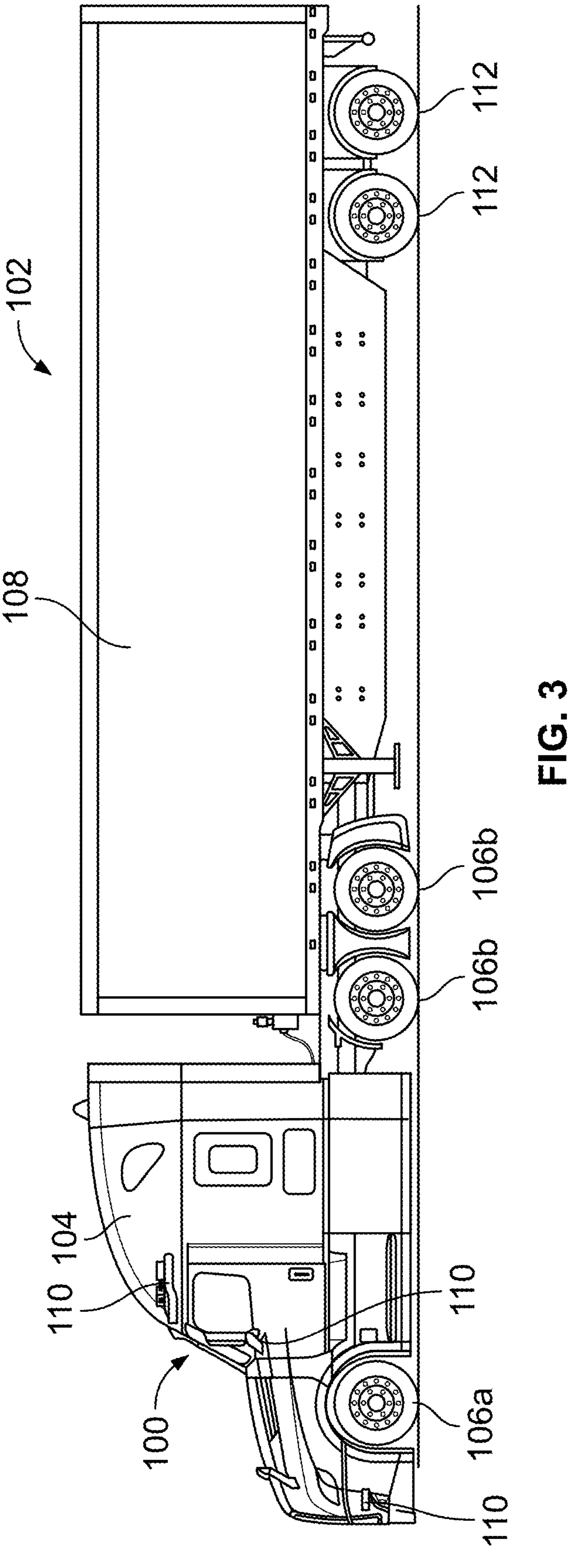
FIG. 3 is a schematic side view of the autonomous truck and trailer of FIG. 2.

FIG. 1 is a perspective view of a vehicle 100. The vehicle may be a truck that may be conventionally connected to a single or tandem trailer 102 to transport the trailer 102 to a desired location, as shown in FIGS. 2 and 3, which are, respectively, perspective and side views of the vehicle 100 of FIG. 1 with the trailer 102 attached thereto. The vehicle 100 includes a cabin 104 that can be supported, and steered in the required direction, by front wheels 106*a* and rear wheels 106*b* that are partially shown in FIG. 1. The front wheels 106*a* are positioned by a steering system that includes a steering wheel and a steering column (not shown). The steering wheel and the steering column may be located in the interior of cabin 104.

The vehicle 100 may be an autonomous vehicle, in which case the vehicle 100 may omit the steering wheel and the steering column to steer the vehicle 100. Rather, the vehicle 100 may be operated by an autonomy computing system of the vehicle 100 based on data collected by a sensor network including one or more sensors, e.g., sensors 110 shown in FIGS. 1-3. The vehicle 100 may additionally include a fifth-wheel coupling (not shown) to which the trailer 102 can be releasably attached. The trailer 102 can include a storage container 108 and a plurality of rear wheels 112 that support the storage container 108. It should be understood that in some embodiments the vehicle 100 and the trailer 102 can be a permanently attached as a single unit.

The sensors 110 have a field-of-view at the front, sides and/or rear of the vehicle 100. Similar sensors 110 can be used around the perimeter of the vehicle 100 to ensure full environmental coverage around the vehicle 100 is provided by the sensors 110. In some embodiments, the vehicle 100 can include, e.g., 5-6 LIDAR sensors, 8-10 cameras, combinations thereof, or the like. In some embodiments, the vehicle 100 can tow a trailer 102 and the trailer 102 can similarly include LIDAR sensors and/or cameras to provide field-of-view coverage around the perimeter of the vehicle 100 and the trailer 102. The environmental coverage by the sensors and/or cameras therefore provides data corresponding with the front, rear, sides and corners of the vehicle 100 and the trailer 102 hauled by the vehicle 100.

Figure 4:
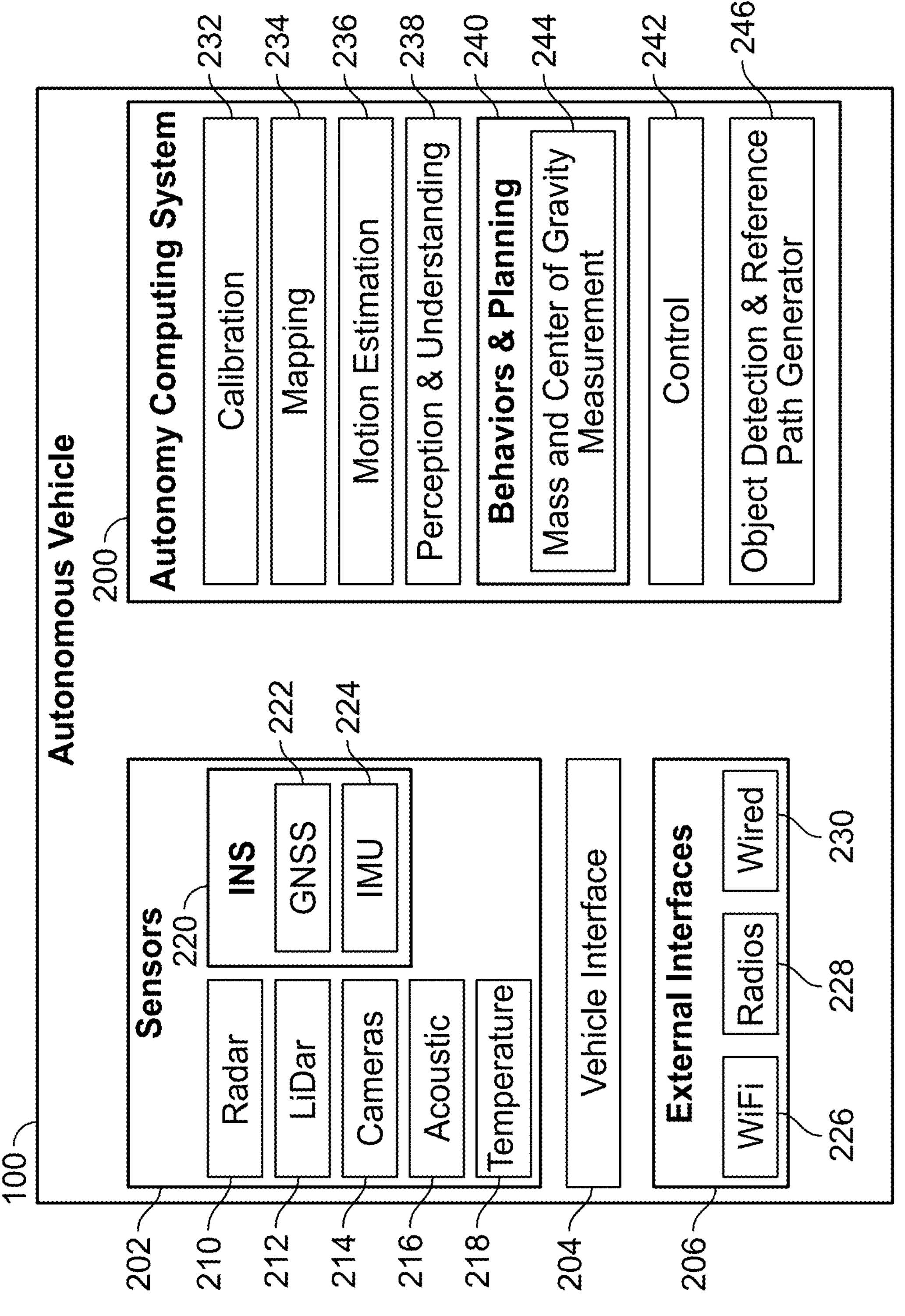
FIG. 4 is a block diagram of the autonomous truck shown in FIGS. 1-3.

FIG. 4 is a block diagram representing autonomous vehicle 100 shown in FIGS. 1-3. In the example embodiment, autonomous vehicle 100 generally includes autonomy computing system 200, sensors 202, a vehicle interface 204, and external interfaces 206. It should be understood that the sensors 110 on the vehicle 100 in FIGS. 1-3 and described herein correspond to the sensors identified as 202 in FIG. 4. The sensors 110 may specifically comprise any of the sensors 208-220 shown in FIG. 4 and described herein.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 218, or inertial navigation system (INS) 220, which may include one or more global navigation satellite system (GNSS) receivers 222 and one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of autonomous vehicle 100 and its proximity. As described in further detail below, these signals may be used by autonomy computing system 200 to determine how to control operations of autonomous vehicle 100.

Cameras 214 are configured to capture images of the environment surrounding autonomous vehicle 100 in any aspect or field-of-view (FOV). The FOV can have any angle or aspect such that images of the areas ahead of, to the side, behind, above, or below autonomous vehicle 100 may be captured. In some embodiments, the FOV may be limited to particular areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 214, and the images from each of the multiple cameras 214 may be processed to identify one or more construction markers in the environment surrounding autonomous vehicle 100. In some embodiments, the image data generated by cameras 214 may be sent to autonomy computing system 200 or other aspects of autonomous vehicle 100 for one or more of identifying objects around the vehicle 100, updating a reference path based on the detected objects, and controlling operation of the vehicle 100 to guide the vehicle 100 along its route.

LiDAR sensors 212 generally include a laser generator and a detector that send and receive a LiDAR signal such that LiDAR point clouds (or "LiDAR images") of the areas ahead of, to the side, behind, above, or below autonomous vehicle 100 can be captured and represented in the LiDAR point clouds. RADAR sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw RADAR sensor data) from the emitted radio waves. In some embodiments, the system inputs from cameras 214, RADAR sensors 210, or LiDAR sensors 212 may be used in combination to identify one or more construction markers (or nodes) around autonomous vehicle 100.

GNSS receiver 222 is positioned on autonomous vehicle 100 and may be configured to determine a location of autonomous vehicle 100, which it may embody as GNSS data. GNSS receiver 222 may be configured to receive one or more signals from a global navigation satellite system (e.g., Global Positioning System (GPS) constellation) to localize autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment.

IMU 224 is a micro-electrical-mechanical (MEMS) device that measures and reports one or more features regarding the motion of autonomous vehicle 100, although other implementations are contemplated, such as mechanical, fiber-optic gyro (FOG), or FOG-on-chip (SiFOG)

devices. IMU 224 may measure an acceleration, angular rate, or an orientation of autonomous vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of autonomous vehicle 100. In some embodiments, the trailer associated with the vehicle 100 can include similar sensors 202 for gathering similar data associated with the trailer, thereby further assisting with control operations of the autonomous vehicle 100.

In the example embodiment, autonomy computing system 200 employs vehicle interface 204 to send commands to the various aspects of autonomous vehicle 100 that actually control the motion of autonomous vehicle 100 (e.g., engine, throttle, steering wheel, brakes, etc.) and to receive input data from one or more sensors 202 (e.g., internal sensors). External interfaces 206 are configured to enable autonomous vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5*g*, Bluetooth, etc.).

In some embodiments, external interfaces 206 may be configured to communicate with an external network via a wired connection 230, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically, or manually) via external interfaces 206 or updated on demand. In some embodiments, autonomous vehicle 100 may deploy with all of the data it needs to complete a mission (e.g., perception, localization, and mission planning) and may not utilize a wireless connection or other connections while underway.

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 232, a mapping module 234, a motion estimation module 236, a perception and understanding module 238, a behavior and planning module 240, a mass and center of gravity measurement module 244, a control module or controller 242, and an object detection and reference path generator module 246. The object detection and reference path generator module 246, for example, may be embodied within another module, such as behaviors and planning module 238, or separately. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 100.

The object detection and reference path generator module 246 may perform one or more tasks including, but not limited to, identifying one or more construction markers (or nodes), generating one or more connectivity graphs based upon identified construction markers (or nodes), updating a reference path based upon the one or more connectivity graphs, transmitting the updated reference path to other modules of the autonomy computing system 200 or mission control or both.

Autonomy computing system 200 of autonomous vehicle 100 may be completely autonomous (fully autonomous) or semi-autonomous. In one example, autonomy computing system 200 can operate under Level 5 autonomy (e.g., full driving automation), Level 4 autonomy (e.g., high driving automation), or Level 3 autonomy (e.g., conditional driving automation). As used herein the term "autonomous" includes both fully autonomous and semi-autonomous.

Figure 5:
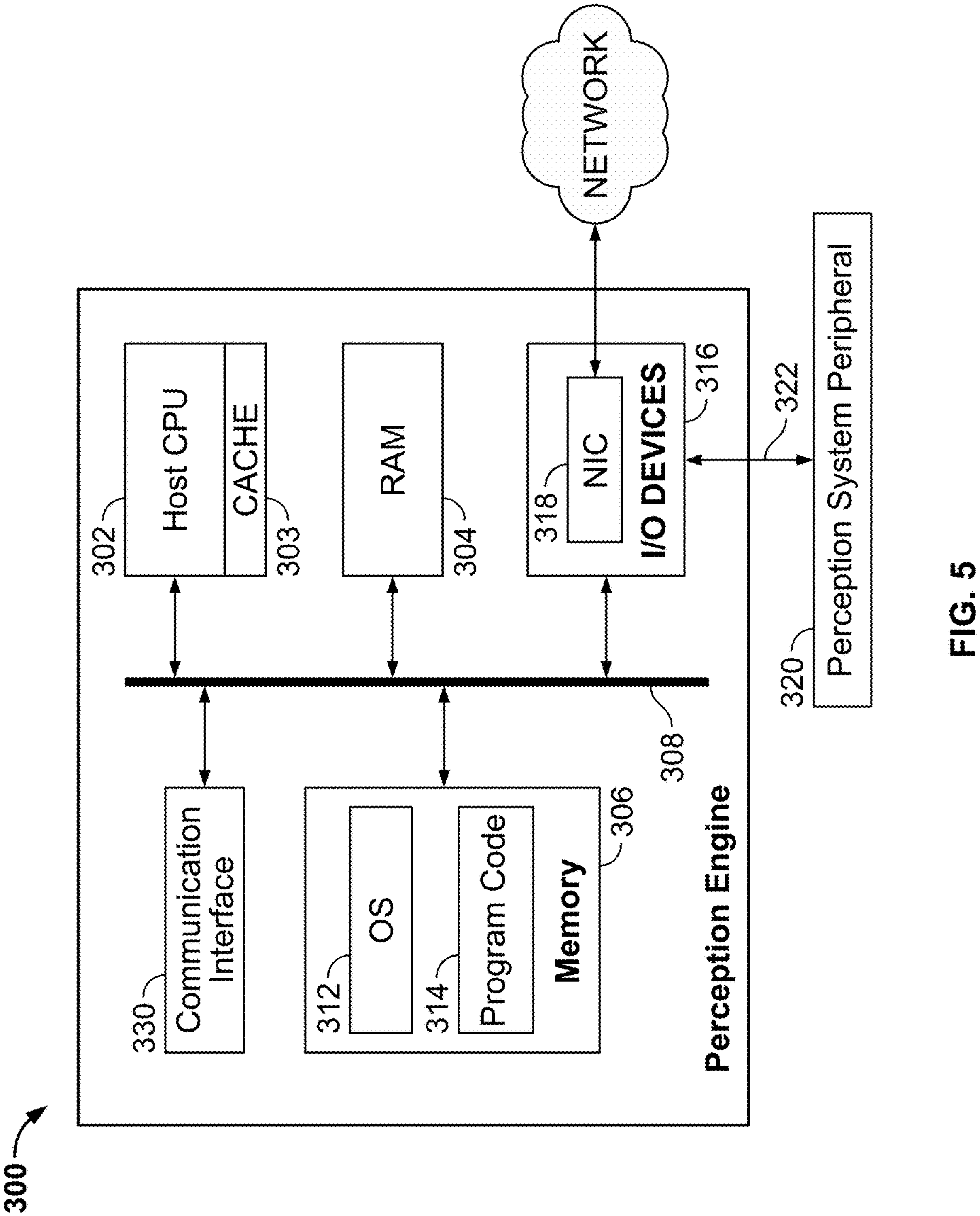
FIG. 5 is a block diagram of an example computing system.

FIG. 5 is a block diagram of an example computing system 300, such as the autonomy computing system 200 shown in FIG. 4, configured for sensing an environment in which an autonomous vehicle is positioned. Computing system 300 includes a CPU 302 coupled to a cache memory 303, and further coupled to RAM 304 and memory 306 via a memory bus 308. Cache memory 303 and RAM 304 are configured to operate in combination with CPU 302. Memory 306 is a computer-readable memory (e.g., volatile, or non-volatile) that includes at least a memory section storing an OS 312 and a section storing program code 314. Program code 314 may be one of the modules in the autonomy computing system 200 shown in FIG. 4. In alternative embodiments, one or more sections of memory 306 may be omitted and the data stored remotely. For example, in certain embodiments, program code 314 may be stored remotely on a server or mass-storage device and made available over a network 332 to CPU 302.

Computing system 300 also includes I/O devices 316, which may include, for example, a communication interface such as a network interface controller (NIC) 318, or a peripheral interface for communicating with a perception system peripheral device 320 over a peripheral link 322. I/O devices 316 may include, for example, a GPU for image signal processing, a serial channel controller or other suitable interface for controlling a sensor peripheral such as one or more acoustic sensors, one or more LiDAR sensors, one or more cameras, or a CAN bus controller for communicating over a CAN bus.

Figure 6:
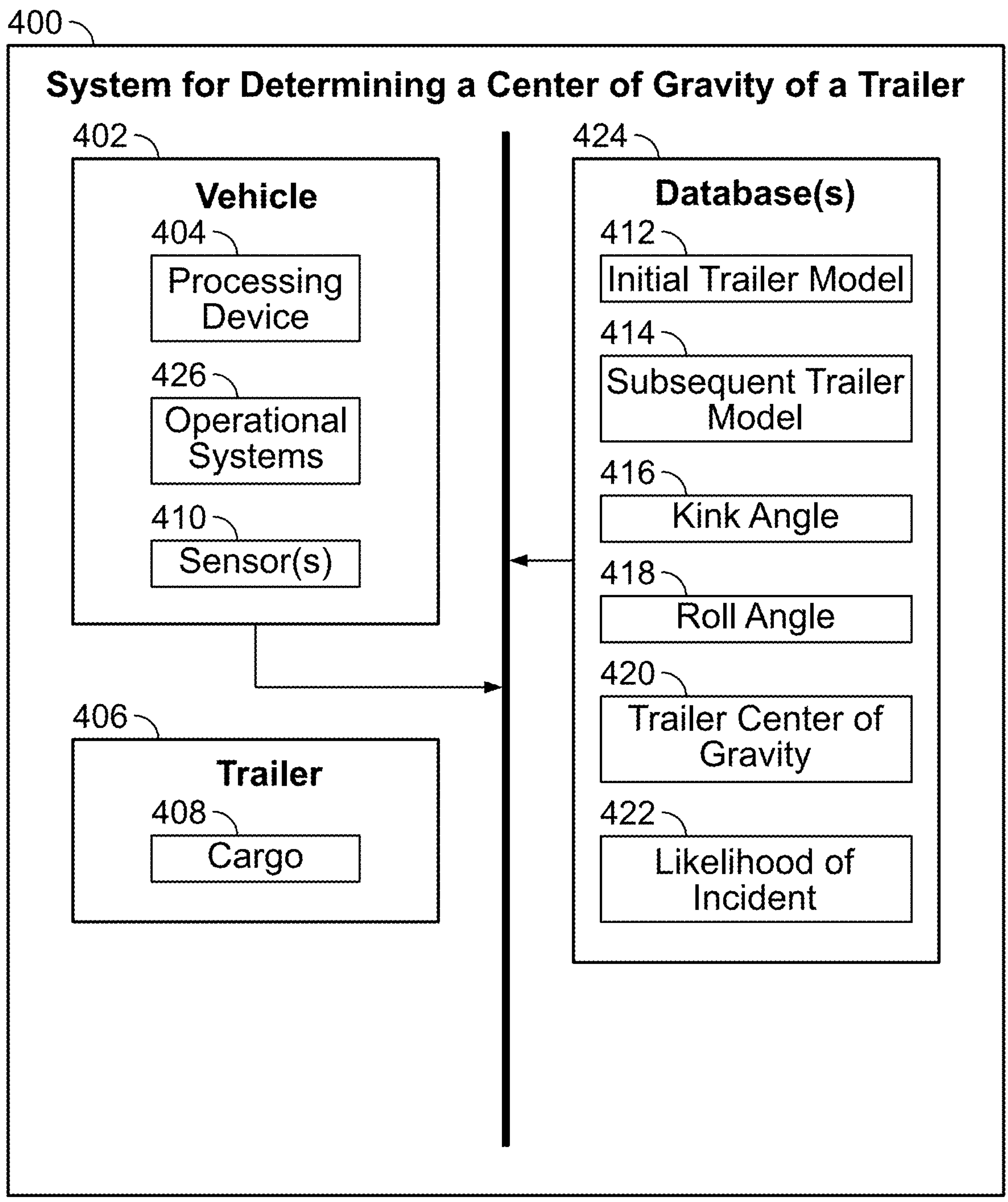
FIG. 6 is a block diagram of an exemplary system for determining a center of gravity for a trailer.

FIG. 6 is a block diagram of an exemplary system 400 for determining a center of gravity of a trailer. The system 400 generally includes one or more vehicles 402 (e.g., autonomous vehicle 100, or the like). Each vehicle 402 includes a processing device 404 (e.g., computing system 200, computing system 300, or the like) configured to receive and process data for determining the center of gravity of a trailer 406 coupled to the vehicle 402. The trailer 406 may include cargo 408 that may affect the center of gravity of the trailer 406 during operation of the vehicle 402 and trailer 406. For example, cargo 408 may shift within the trailer 406 during operation of the vehicle 402 and trailer 406 and cause a center of gravity of the trailer 406 to also shift. In some embodiments, the trailer 406 may be a box trailer and the cargo 408 may be enclosed within the trailer 406. In other embodiments, the trailer may be a flatbed trailer and the cargo 408 may rest on the floor of the flatbed. At least some of the data received by the processing device 404 can be data from one or more sensors 410 (e.g., sensors 202). For example, the sensors 410 can detect at least one edge of the trailer 406 and/or points along each side of the trailer 406 at different times and the processing device 404 can generate a trailer model 412 representative of the orientation of the trailer 406 at those times. The processing device 404 can similarly generate an initial trailer model 412 based on detection of points or edges of the cargo 408 when the trailer 406 is a flatbed. In an exemplary embodiment, the sensors 410 may be configured to measure at least one initial point on at least one of a first side and a second side of the trailer 406 and the at least one initial point may be used to generate an initial trailer model 412.

The vehicle 402 can include one or more databases 424 (e.g., memory 306) configured to receive and electronically store data. For example, the database 424 may store the initial trailer model 412 once generated by the processing device 404. In some embodiments, the database 424 can be stored externally from the vehicle 402 and the vehicle 402 can be in communication with the external database 424 for receiving and/or transmitting data associated with the system 400. In some embodiments, the vehicle 402 can include at least one sensor 410 on one side of the vehicle 402 (e.g., the left side) and another sensor 410 on the opposing side of the vehicle 402 (e.g., the right side). Each of the sensors 410 includes a field-of-view in which the sensors 410 can be used to detect objects and estimate their distance from the sensors 410. With respect to the trailer 406, the sensors 410 can be used to detect points along at least one of a first side (e.g., the left side) and/or a second side (e.g., the right side) of the trailer 406 at any time when the first side and/or the second side of the trailer 406 are within the field-of-view of the sensors 410.

At a subsequent time after the initial points are identified, the sensors 410 may be configured to measure at least one subsequent point on at least one of the first side and the second side of the trailer 406 when the first side and/or the second side of the trailer 406 are within the field-of-view of the sensors 410 and the at least one subsequent point may be used to generate a subsequent trailer model 414 at subsequent times after the initial points are identified. The at least one subsequent point on the at least one of the first side and the second side of the trailer 406 may be iteratively measured and used to iteratively generate subsequent trailer models 414 for each of the subsequent times after the initial points are identified. The initial trailer model 412 and the subsequent trailer models 414 may be assessed to identify differences and the similarities between the initial trailer model 412 and the subsequent trailer model 414.

The assessment of the initial trailer model 412 and the subsequent trailer model 414 may be used to determine a kink angle 416 and/or a roll angle 418 of the trailer 406 at each of the subsequent times after the initial points are identified for automated monitoring of the orientation of the trailer 406. The kink angle 416 and/or the roll angle 418 may be used to determine a center of gravity 420 of the trailer 406 at each of the subsequent times. The kink angle 416, the roll angle 418, and/or the center of gravity 420 of the trailer 406 may be used to determine a likelihood of an incident 422 involving the trailer 406.

At least one of the kink angle 416, the roll angle 418, the center of gravity 420, and the likelihood of incident 422 may be input into one or more of the operational systems 426 (e.g., autonomy computing system 200). The one or more of the operational systems 426 may regulate the operation of the vehicle 402 to maintain stability and control and prevent accidents involving the trailer 406 (e.g., jackknifing, roll over, or the like) during travel of the vehicle 402 and the trailer 406. For example, the one or more of the operational systems 426 may control the speed at which the vehicle 402 can travel during turning operations to ensure the vehicle 402 can safely maintain stability and control of the trailer 406 and/or cargo 408.

Figure 7:
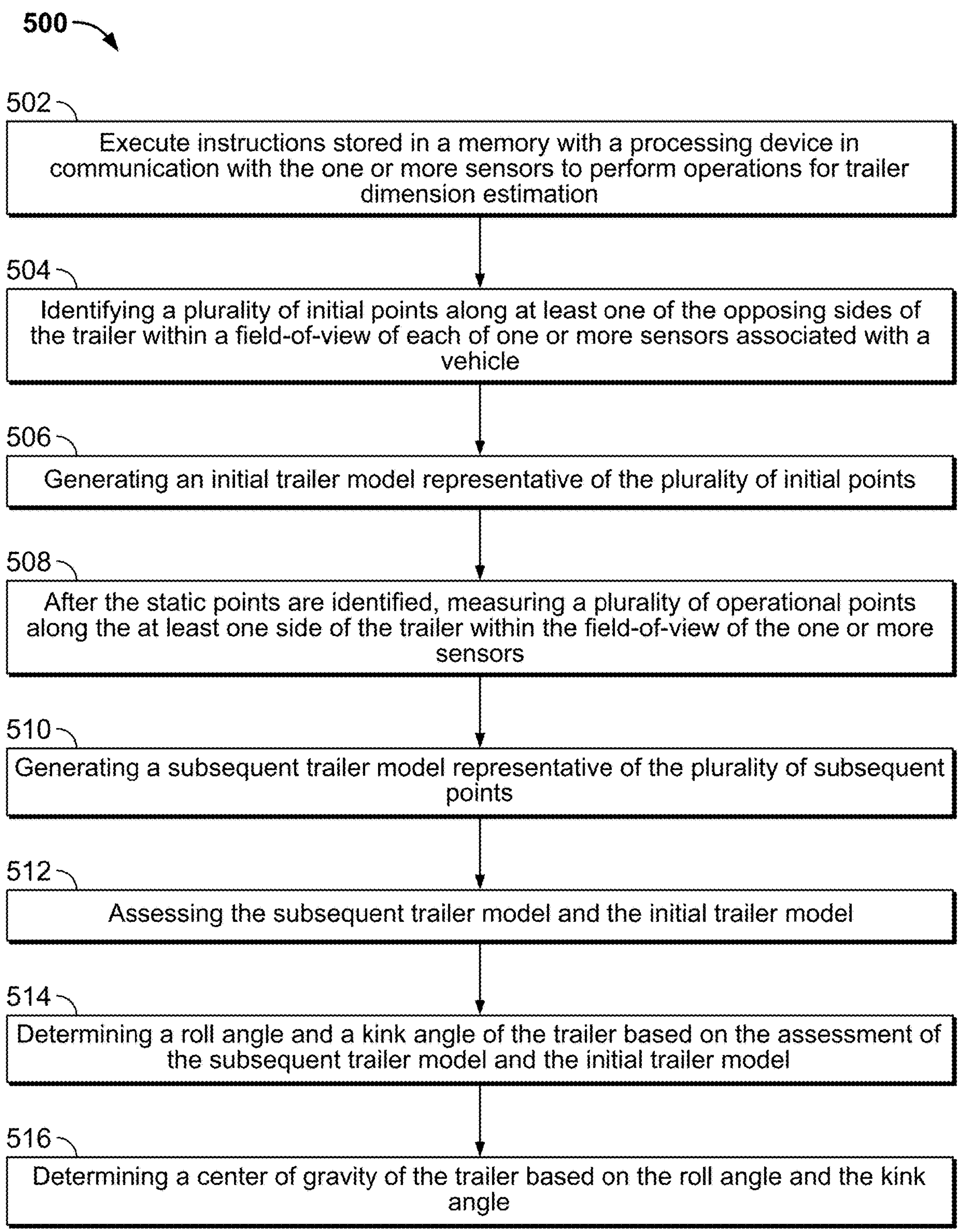
FIG. 7 is a flowchart of a method for determining a center of gravity for a trailer.

FIG. 7 is a flowchart of a method 500 for determining a center of gravity of a trailer coupled to a vehicle by the exemplary system 400 discussed herein. The vehicle includes one or more sensors associated with the vehicle. Each of the one or more sensors has a field-of-view. The trailer includes a front portion disposed proximate to the vehicle, a rear portion with a rear edge disposed distal to the vehicle, and first and second sides, each extending between the front and rear portions. At 502, instructions stored in a memory are executed with a processing device in communication with the sensors to perform operations for determining a center of gravity of the trailer.

At 504, the operations include measuring a plurality of initial points along at least one of the first and second sides of the trailer within a field-of-view of the one or more sensors associated with the vehicle. At 506, the operations include generating an initial trailer model representative of the plurality of initial points. At 508, after the initial points are identified, the operations include measuring a plurality of subsequent points along the at least one of the first side and the second side of the trailer within the field-of-view of the one or more sensors. At 510, the operations include generating a subsequent trailer model representative of the plurality of subsequent points. At 512, the operations include assessing the subsequent trailer model and the initial trailer model. At 514, the operations include determining a roll angle 418 and a kink angle 416 of the trailer based on the assessment of the subsequent trailer model and the initial trailer model. At 516, the operations include determining a center of gravity of the trailer based on the determined roll angle 418 and the kink angle 416.

Figure 8:
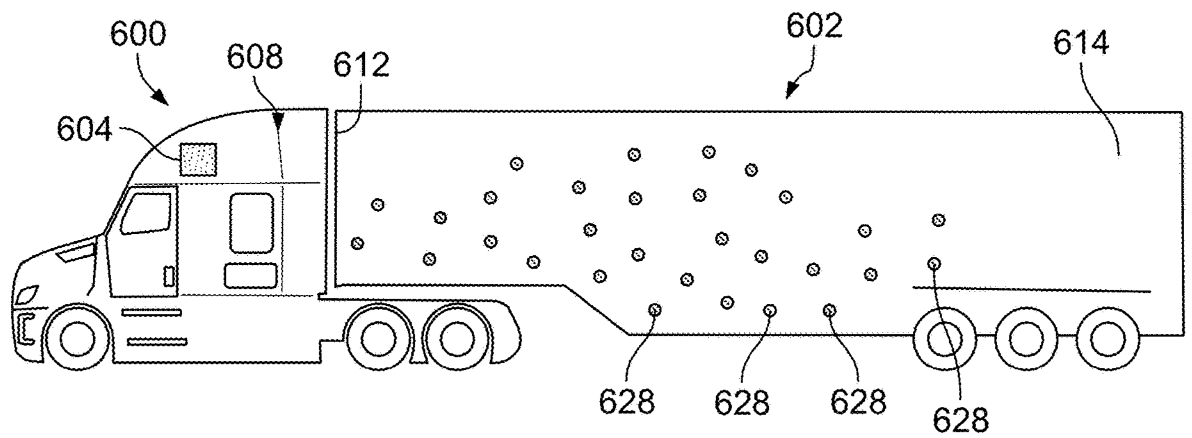
FIG. 8 is a diagrammatic side view of a vehicle and trailer coupled to the vehicle, including a first sensor mounted to a first side of the vehicle and a plurality of removable patches removably attached to the trailer.
Figure 9:
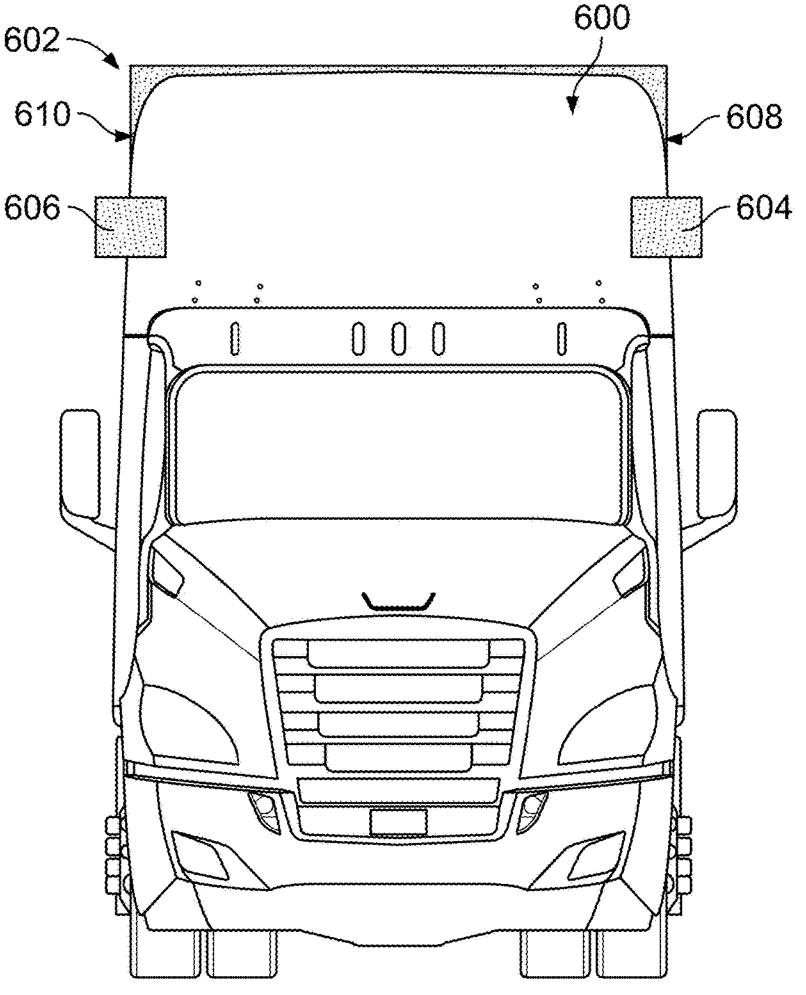
FIG. 9 is a diagrammatic front view of a vehicle and trailer, including a first sensor mounted to a first side of the vehicle and a second sensor mounted to a second side of the vehicle.
Figure 10:
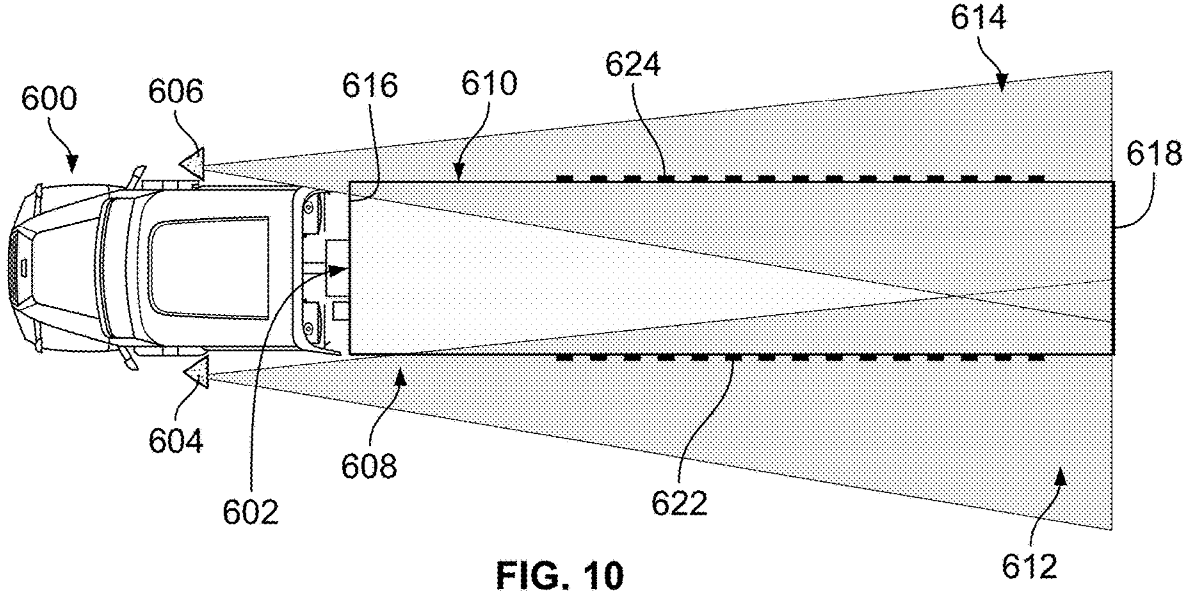
FIG. 10 is a diagrammatic top view of a vehicle and trailer, including field-of-views of the first and second sensors of FIG. 9, a first plurality of initial points along the first side of the trailer, and a second plurality of initial points along the second side of the trailer.

FIG. 8 depicts a side view of a vehicle 600 (e.g., vehicle 400, a cab, a truck, or the like) and a trailer 602 (e.g., trailer 406, or the like) coupled to the vehicle 600 including a first sensor 604 mounted to a first side 608 of the vehicle 600 and a plurality of patches 628 removably attached to the trailer 602 on the first side 608. FIG. 9 depicts a front view of the vehicle 600 and the trailer 602 coupled to the vehicle 600 including the first sensor 604 mounted to the first side of the vehicle 600 and a second sensor 606 mounted to a second side of the vehicle 600. FIG. 10 depicts a top view of the vehicle 600 and trailer 602, showing a field-of-view 612 of the first sensor 604 of FIG. 9, a field-of-view 614 of the second sensor 606 of FIG. 9, a first plurality 622 of initial points along a first side 608 of the trailer 602, and a second plurality 624 of initial points along a second side 610 of the trailer 602 when the kink angle and the roll angle are zero degrees. The vehicle 600 includes at least one sensor 604 (e.g., sensor 110, sensor 202, sensor 410, or the like) on a first side (e.g., the left side) of the vehicle 600 and at least one sensor 606 (e.g., sensor 110, sensor 202, sensor 410, or the like) on an opposing second side (e.g., the right side) of the vehicle 600. Each sensor 604, 606 includes a respective field-of-view 612, 614 extending along respective sides 608, 610 of the trailer 602. In some embodiments, each sensor 604, 606 may be used for multiple purposes. For example, each sensor 604, 606 may be configured to monitor an orientation of the trailer 602, as described herein, an environment surrounding the trailer, or the like.

Figure 11:
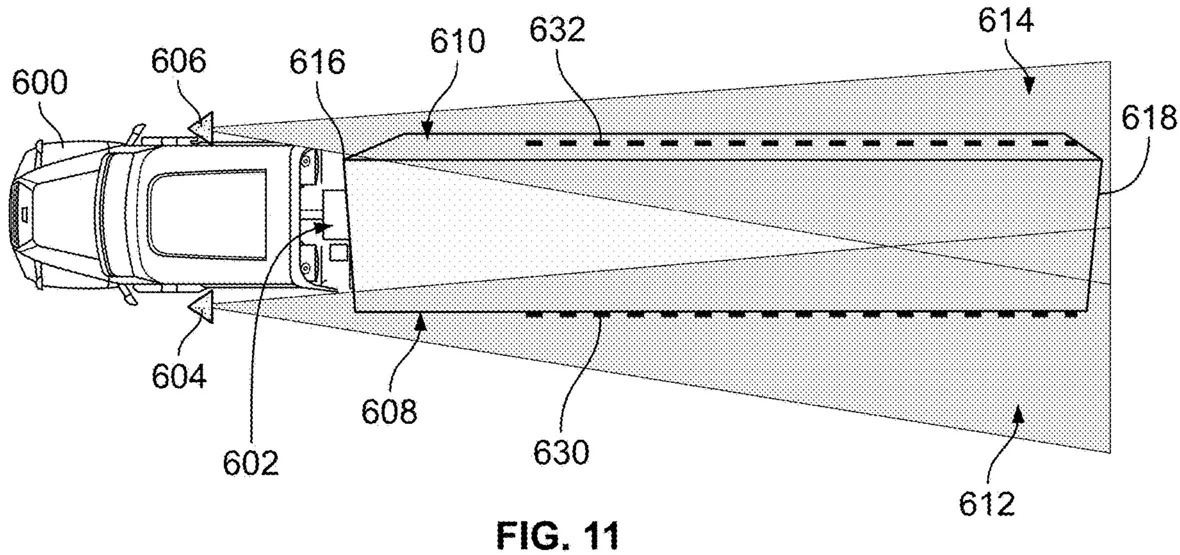
FIG. 11 is a diagrammatic top view of a vehicle and trailer, showing the field-of-view of the first sensor, the field-of-view of the second sensor, a first plurality of subsequent points along the first side of the trailer, and a second plurality of subsequent points along the second side of the trailer.

The trailer 602 includes a front portion 616 disposed proximate to the vehicle 600, a rear portion 618 disposed distal to the vehicle 600, the first side portion 608, and the second side portion 610, with each of the first side portion 608 and the second side portion 610 extending between the front portion 616 and the rear portion 618, as shown in FIGS. 10 and 11. A processing device (e.g., processing device 404, or the like) for the vehicle 600 may use inputs from the first sensor 604 and/or the second sensor 606 to measure a plurality of initial points for the trailer 602. The field-of-view 612 for the first sensor 604 extends along the first side 608 of the trailer 602 to allow the processing device to measure a first plurality 622 of initial points along the first side 608 of the trailer 602 at an initial time using the first sensor 604 when the first side 608 of the trailer 602 is within the field-of-view 612. The field-of-view 614 for the second sensor 606 extends along a second side 610 of the trailer 602 to allow the processing device for the vehicle to measure a second plurality 624 of initial points along the second side 610 of the trailer 602 at an initial time when the second side 610 of the trailer 602 is within the field-of-view 614. For example, the initial time may be during coupling of the trailer 602 to the vehicle 600, immediately after coupling of the trailer 602, before initiating operation of the vehicle 600 and trailer 602, or the like. The processing device may measure at least one of the first plurality 622 and the second plurality 624 of initial points. In some embodiments, when each of the first plurality 622 and the second plurality 624 of initial points are measured, the processing device may aggregate each of the first plurality 622 and the second plurality 624 of initial points as the plurality of initial points.

In some embodiments, the trailer 602 may include a plurality of patches 628 (shown in FIG. 8) removably attached to the trailer 602 on at least one of the first side 608 and the second side 610. The plurality of patches 628 on the first side 608 of the trailer 602 may improve a quality of detection of the first plurality 622 of initial points by the first sensor 604. The plurality of patches 628 on the second side 610 of the trailer 602 may improve a quality of detection of the second plurality 624 of initial points by the second sensor 606. For example, when a surface of the trailer 602 interferes with reflection of a signal back to the first sensor 604 and the second sensor 606, the plurality of patches 628 may improve reflection of a signal back to the first sensor 604 and the second sensor 606 and improve the quality of detection of the plurality of initial points by the first sensor 604 and/or the second sensor 606. In an exemplary embodiment, the plurality of patches 628 may be reflective patches that are configured to improve a return LiDAR signal back to the first sensor 604 and/or the second sensor 606 improve the quality of detection of the plurality of initial points by the first sensor 604 and/or the second sensor 606 on trailer 602 with a surface that interferes with the reflection of LiDAR signals from the first sensor 604 and/or the second sensor 606. The plurality of patches 628 may be located along any portion of the first side 608 and/or the second side 610 of the trailer 602. In some embodiments, the plurality of patches 628 may be positioned on the first side 608 and/or the second side 610 of the trailer 602 to avoid obstructing the display of advertisements, images, or the like on the first side 608 and/or the second side 610 of the trailer 602.

The processing device of the vehicle 600 generates an initial trailer model (e.g., initial trailer model 412, or the like) representative of the plurality of initial points. The initial trailer model may be a two-dimensional model and/or a three-dimensional model based on the plurality of initial points. For example, in some embodiments, when only one of the first plurality 622 and the second plurality 624 of initial points are measured, the processing device may generate a two-dimensional model (e.g., a two-dimensional plane) representative of the first plurality 622 or the second plurality 624 of initial points. When each of the first plurality 622 and the second plurality 624 of initial points are measured, the processing device may generate a three-dimensional model (e.g., point cloud or the like) representative of each of the first plurality 622 and the second plurality 624 of initial points.

FIG. 11 depicts a top view of a vehicle and trailer, showing the field-of-view 612 of the first sensor 604, the field-of-view 614 of the second sensor 606, a first plurality 630 of subsequent points along the first side 608 of the trailer 602, and a second plurality 632 of subsequent points along the second side 610 of the trailer 602. The processing device for the vehicle 600 may use inputs from the first sensor 604 and/or the second sensor 606 to measure a plurality of subsequent points for the trailer 602 at a subsequent time, after the initial time, when the first side 608 and/or the second side 610 of the trailer 602 are within the field-of-view 612 for the first sensor 604 and/or the field-of-view 614 for the second sensor 606. The field-of-view 612 for the first sensor 604 extends along the first side 608 of the trailer 602 to allow a processing device to measure the first plurality 630 of subsequent points along the first side 608 of the trailer 602 at the subsequent time using the first sensor 604 when the first side 608 of the trailer 602 is within the field-of-view 612. The field-of-view 614 for the second sensor 606 extends along a second side 610 of the trailer 602 to allow the processing device for the vehicle to measure a second plurality 632 of subsequent points along the second side 610 of the trailer 602 at the subsequent time when the second side 610 of the trailer 602 is within the field-of-view 614. For example, the subsequent time may be any time after the plurality of initial points are measured, such as after initiating operation of the vehicle 600 and trailer 602, during operation of the vehicle 600 and trailer 602, or the like. The processing device may iteratively measure at least one of the first plurality 630 and the second plurality 632 of subsequent points during operation of the vehicle to continuously monitor the trailer 602. In some embodiments, when each of the first plurality 630 and the second plurality 632 of subsequent points are measured, the processing device may aggregate each of the first plurality 630 and the second plurality 632 of subsequent points as the plurality of subsequent points.

In some embodiments, the plurality of patches 628 (shown in FIG. 8) on the first side 608 of the trailer 602 may be used to improve a quality of detection of the first plurality 630 of subsequent points by the first sensor 604. The plurality of patches 628 on the second side 610 of the trailer 602 may be used to improve a quality of detection of the second plurality 632 of subsequent points by the second sensor 606.

Figure 13B:
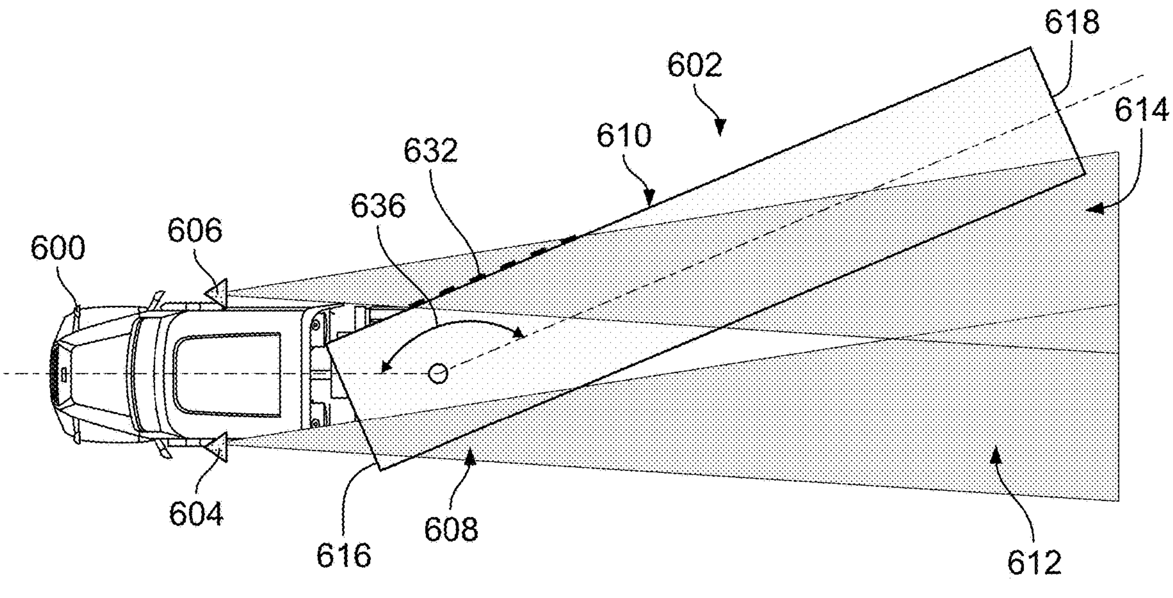
FIG. 13B a diagrammatic top view of a vehicle and trailer, field-of-views of the first and second sensors, and portions of a point cloud for a second side the trailer during a turning action by the vehicle and trailer in a second direction.

Operation of the vehicle 600 and the trailer 602 may cause the trailer 602 to tilt, as shown in FIGS. 12A and 12B, and/or a rear portion 618 of the trailer 602 to swing from side to side, as shown in FIGS. 13A and 13B. In some embodiments, the tilting and the swinging of the trailer 602 may cause the field-of-view 612 for the first sensor 604 or the field-of-view 614 for the second sensor 606 to be occluded by the front portion 616 of the trailer 602 and only one of the first plurality 630 and the second plurality 632 of subsequent points may be measured, as shown in FIGS. 13A and 13B.

FIG. 12A depicts front view of the vehicle 600 and the trailer 602 of FIG. 9 showing a roll angle 634 for the trailer 602 in a first direction that can occur at a subsequent time after the plurality of initial points are measured. A roll angle 634 is the amount of tilt of a longitudinal axis 636 of a trailer 602 around the longitudinal centerline 638 of the vehicle 600. When the trailer 602 is tilted in the first direction, the roll angle 640 may be an angle less than 0 indicating the trailer 602 has rolled towards the first side 608 and the field-of-view 612 for the first sensor 604 may be, at least, partially occluded by the front portion 616 of the trailer and portions of the first side 608 of the trailer 602 may be outside of the field-of-view 612 for the first sensor 604. The processing device may only measure the first plurality 630 of subsequent points along the portions of the first side 608 of the trailer 602 that are within the field-of-view 612 using the first sensor 604. The processing device may also use the second sensor 606 to measure the second plurality 632 of subsequent points along the portions of the second side 610 of the trailer 602 that are within the field-of-view 614 of the second sensor 606.

FIG. 12B depicts a front view of the vehicle 600 and the trailer 602 showing the roll angle 634 for the trailer 602 in a second direction that can occur at a subsequent time after the plurality of initial points are measured. When the trailer 602 is tilted in the second direction, the roll angle 640 may be an angle greater than 0 indicating the trailer 602 has rolled towards the second side 610 and the field-of-view 614 for the second sensor 606 may be, at least, partially occluded by the front portion 616 of the trailer and portions of the second side 610 of the trailer 602 may be outside of the field-of-view 614 for the second sensor 606. The processing device may only measure the second plurality 632 of subsequent points along the portions of the second side 610 of the trailer 602 that are within the field-of-view 614 using the second sensor 606. The processing device may also use the first sensor 604 to measure the first plurality 630 of subsequent points along the portions of the first side 608 of the trailer 602 that are within the field-of-view 612 of the first sensor 604.

FIG. 13A depicts a top view of a vehicle and trailer, showing the field-of-view 612 of the first sensor 604, the field-of-view 614 of the second sensor 606, the first plurality 630 of subsequent points along the first side 608 of the trailer 602, and a kink angle 640 for the trailer 602 during a turning action in a first direction (e.g., a left turn) during operation of the vehicle 600 and trailer 602. A kink angle 640 is the angular difference between the longitudinal axis 636 of a trailer 602 and the longitudinal centerline 638 of the vehicle 600 indicating how much the trailer 602 is angled relative to the vehicle 600. During the turning action in the first direction, the kink angle 640 may be an angle less than 0 indicating the first side 608 of the trailer 602 is angled towards the first sensor 604 and the field-of-view 614 for the second sensor 606 may be occluded by the front portion 616 of the trailer and the second side 610 of the trailer 602 may be outside of the field-of-view 614 for the second sensor 606. Consequently, the processing device may not be able to measure the second plurality 632 of subsequent points along the second side 610 of the trailer 602 using the second sensor 606. The processing device may use the first sensor 604 to measure the first plurality 630 of subsequent points along a portion of the first side 608 of the trailer 602 that is within the field-of-view 612 of the first sensor 604 during the turning action in the first direction, as shown in FIG. 13A.

FIG. 13B depicts top view of a vehicle and trailer, showing the field-of-view 612 of the first sensor 604, the field-of-view 614 of the second sensor 606, and the second plurality 632 of subsequent points along the second side 610 of the trailer 602, and the kink angle 640 for the trailer 602 during a turning action in a second direction (e.g., a right turn) during operation of the vehicle 600 and trailer 602. During the turning action in the second direction, the kink angle 640 may be an angle greater than 0 indicating the second side 610 of the trailer 602 is angled towards the second sensor 606 and the field-of-view 612 for the first sensor 604 may be occluded by the front portion 616 of the trailer and the first side 608 of the trailer 602 may be outside of the field-of-view 612 for the first sensor 604. Consequently, the processing device may not be able to measure the first plurality 630 of subsequent points along the first side 610 of the trailer 602 using the first sensor 604. The processing device may use the second sensor 606 to measure the second plurality 632 of subsequent points along a portion of the second side 610 of the trailer 602 that is within the field-of-view 614 of the first sensor 606 during the turning action in the first direction, as shown in FIG. 13A.

The processing device of the vehicle 600 generates a subsequent trailer model (e.g., subsequent trailer model 414, or the like) representative of the plurality of subsequent points. The subsequent trailer model may be a two-dimensional model and/or a three-dimensional model based on the plurality of subsequent data points. For example, in some embodiments, when only one of the first plurality 630 and the second plurality 632 of subsequent points are measured, the processing device may generate a two-dimensional model (e.g., a two-dimensional plane) representative of the first plurality 630 or the second plurality 632 of subsequent points. When each of the first plurality 630 and the second plurality 632 of subsequent points are measured, the processing device may generate a three-dimensional model (e.g., point cloud or the like) representative of each of the first plurality 630 and the second plurality 632 of subsequent points. In some embodiments, the processing device may iteratively generate the subsequent trailer model based on the iterative measurement of the first plurality 630 and the second plurality 632 of subsequent points during operation of the vehicle to continuously monitor the trailer 602.

Figure 14:
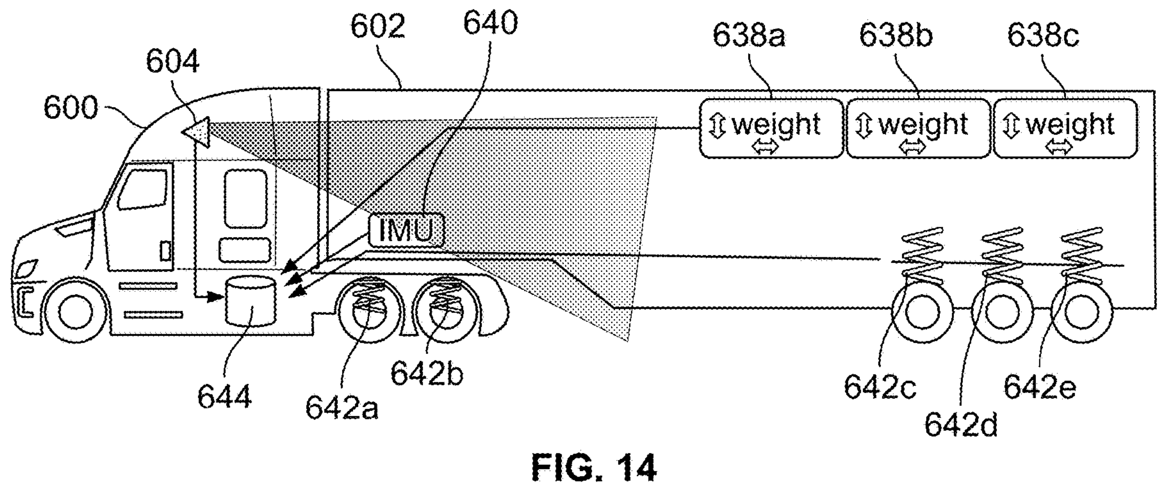
FIG. 14 is a diagrammatic side view of a vehicle and trailer for use in gathering ground truth data for training a machine learning model, including a plurality of movable weights, an inertial measurement unit (IMU), and a plurality of sensors.

Once each of the subsequent trailer model and the initial trailer model are generated, the processing device may assess the subsequent trailer model and the initial trailer model. The processing device may identify differences and similarities between the initial trailer model and the subsequent trailer model. For example, the processing device may identify each point in the subsequent trailer model and match each of the identified points from the subsequent trailer model to the closest corresponding point in the initial trailer model. In some embodiments, the processing device may calculate a distance between corresponding points in the initial trailer model and the subsequent trailer model and compare the distances with a threshold distance to identify similarities and differences between the subsequent trailer model and the initial trailer model. For example, when the calculated distance is greater than the threshold distance, the processing device may identify a difference between the subsequent trailer model and the initial trailer model. In some embodiments, the processing device can execute a machine learning model (e.g., a neural network, such as a convolutional neural network, or the like) to assess the subsequent trailer model and the initial trailer model for trailers 602 with more complex geometries, such as tankers, flatbeds, or the like. Ground truth data for the machine learning model may be gathered using a vehicle 602 including a plurality of movable weights 638*a*, 638*b*, 638*c*, an inertial measurement unit (IMU) 640, and a plurality of actuators 642*a*, 642*b*, 642*c*, 642*d*, 642*e*, as shown in FIG. 14.

The processing device determines the roll angle 634 and the kink angle 640 of the trailer 602 at the subsequent time based on the assessment of the subsequent trailer model and the initial trailer model. For example, the processing device may calculate an estimated amount of rotation and/or shift between each of the identified points from the subsequent trailer model and each of the closest corresponding point in the initial trailer model matched to the identified point. The estimated amount of rotation and/or shift may then be used to determine the roll angle 634 and the kink angle 640 of the trailer 602.

The processing device determines a center of gravity of the trailer based on the roll angle and the kink angle. The processing device can use the determined roll angle and the kink angle of the trailer to determine the center of gravity of the trailer at the same subsequent time. In some embodiments, the processing device can use the determined roll angle, kink angle, and center of gravity for the trailer 602 to determine a likelihood of an incident for the trailer. For example, the processing device may assess each of the roll angle, the kink angle, and the center of gravity against a corresponding safe operation range for each of the roll angle, the kink angle, and the center of gravity. The processing device may generate a likelihood of incident for the trailer 602 based on the assessment of the roll angle, the kink angle, and the center of gravity against the corresponding safe operation range for each of the roll angle, the kink angle, and the center of gravity for the trailer 602.

The processing device may transmit at least one of the roll angle, the kink angle, the center of gravity, and the likelihood of incident for the trailer to at least one operational system (e.g., operational systems 426, or the like) configured to regulate operation of the autonomous vehicle. The at least one operational system may regulate the operation of the vehicle 600 to maintain control and stability of the trailer 602 and prevent accidents involving the trailer 602. For example, the one or more of the operational systems may limit the speed at which the vehicle 600 is traveling at the subsequent time to ensure the vehicle 600 can safely operate without causing an accident involving the trailer (e.g., rollover, jackknifing, or the like).

Once the trailer is outside of the field-of-view of each of the first sensor 604 and the second sensor 606, the processing device may purge the initial trailer model. For example, once the vehicle 600 and trailer 602 have reached their intended destination, the trailer 602 may be decoupled from the vehicle. Once the trailer 602 is decoupled from the vehicle 600 and the vehicle 600 pulls away from the trailer 602, the trailer 602 eventually exits the field-of-view 612 of the first sensor 604 and the field-of-view 614 of the second sensor 614. Once the trailer 602 is outside the field-of-view 612 of the first sensor 604 and the field-of-view 614 of the second sensor 614, the processing device may purge the initial trailer model to ensure that the initial trailer model is not used during monitoring of the next trailer that is coupled to the vehicle 600.

FIG. 14 is a diagrammatic side view of a vehicle 600 and trailer 602 for use in gathering ground truth data for training a machine learning model. The trailer 602 includes a plurality of movable weights 638*a*, 638*b*, 638*c*, an inertial measurement unit (IMU) 640, and a plurality of sensor 642*a*, 642*b*, 642*c*, 642*d*, 642*e*. The plurality of movable weights 638*a*, 638*b*, 638*c* may be located at different positions on the trailer 602 to provide precise center of gravity data for the trailer 602 for storage in database 644. The IMU 640 may provide IMU data, such as movement data, orientation data, acceleration data, angular velocity data, or the like for storage in the database 644. For example, the IMU 640 may provide precise kink angle and roll angle data for the trailer at all times for the trailer 602 during operation of the vehicle 600. The plurality of sensor 642*a*, 642*b*, 642*c*, 642*d*, 642*e* may gather wheel travel data for the vehicle 600 and trailer 602 for storage in the database 644. The wheel travel data may indicate a vertical displacement of each wheel at different times during operation of the vehicle 600. For example, when the vehicle 600 and trailer 602 pass over a bump in a road, the plurality of sensors 642*a*, 642*b*, 642*c*, 642*d*, 642*e* may provide data about the displacement of each wheel before, during, and after passing over the bump.

The vehicle 602 also includes the first sensor 604 and the second sensor 606 to gather dynamic data about the trailer. The dynamic data may be input into and stored by the database 644. Each of the dynamic data, the center of gravity data, the IMU data, and the wheel travel data may be input into the machine learning model as training data to train the machine learning model to determine the center of gravity data, the IMU data, and the wheel travel data based on the dynamic data.

Figure 15:
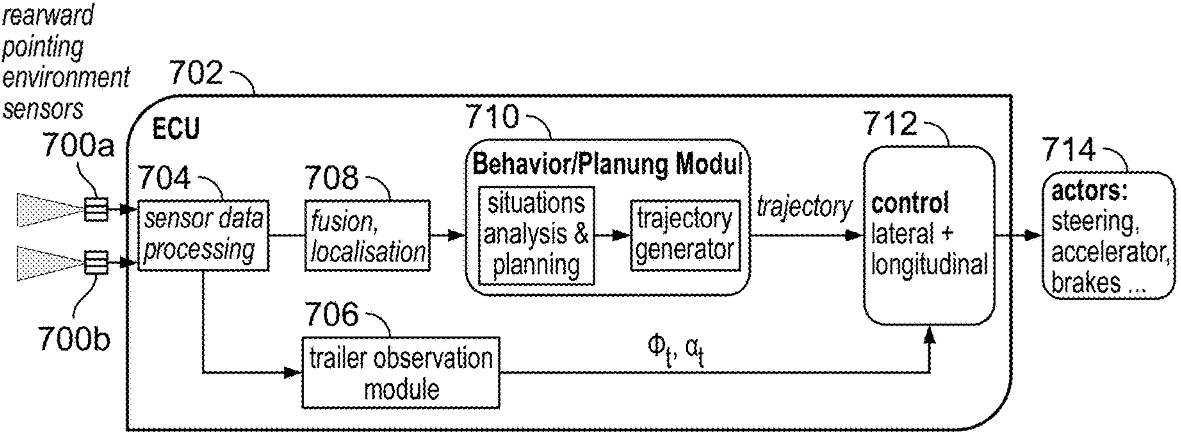
FIG. 15 is a block diagram and flow chart of an exemplary method for determining a center of gravity for a trailer.

FIG. 15 is a block diagram and flow chart of an exemplary method for determining a center of gravity for a trailer (and subsequent vehicle control). The sensor(s) 700*a*, 700*b* perceive the a plurality of points (e.g., a plurality of initial points or a plurality of subsequent points) along at least one side of a trailer coupled to a vehicle. This information is input to the electronic control unit (ECU) 702 for processing at 704. Once the data is processed, the processed information from the sensors 700*a*, 700*b* may be combined and the position and orientation of the vehicle within its environment may be determined at 706. The combined information from the sensors 700*a*, 700*b* and the determined position and orientation of the vehicle are input into a behavior and planning module 710 (e.g., behavior and planning module 240, or the like) to determine a trajectory for the vehicle.

The ECU 702 includes a trailer observation module 708 to receive the processed information. The trailer observation module 708 determines a roll angle and a kink angle, as described in further detail in FIG. 16. The trajectory for the vehicle, the roll angle, and the kink angle are input into a control module 712 (e.g., a control module or controller 242, or the like). The control module 712 is used to adapt the driving or operating behavior of the vehicle based on, at least, the roll angle and the kink angle. The control module 712 controls the actuators 714 of the vehicle to operate based on the roll angle and the kink angle. This allows the vehicle to maintain stability and control of the trailer to prevent an accident involving the trailer and adjusts the vehicle operation in real-time based on changes in the orientation of the trailer.

Figure 16:
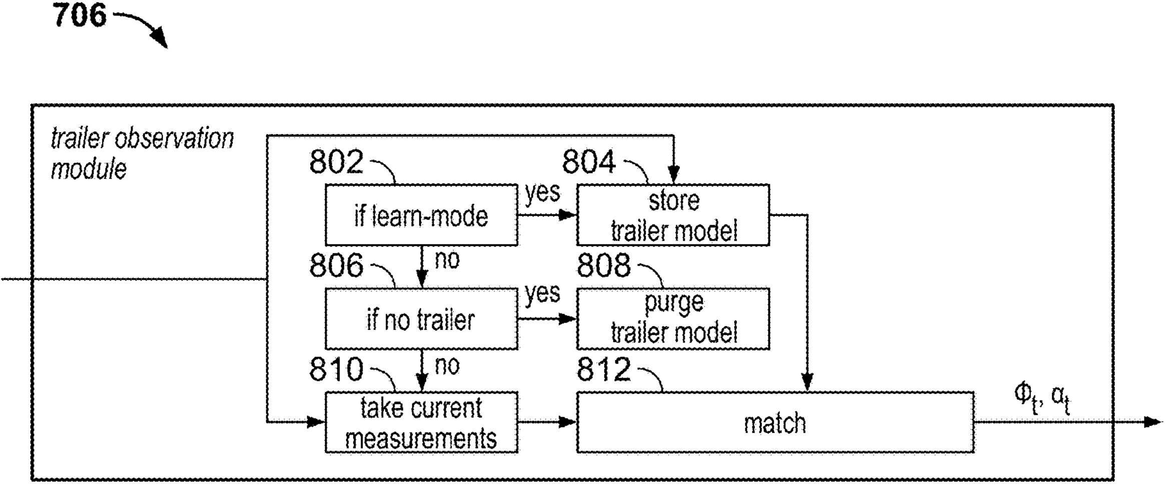
FIG. 16 is a flow chart of an exemplary method for determining a roll angle and a kink angle of a trailer by a trailer observation module for determining a center of gravity of the trailer.

FIG. 16 is a flow chart of an exemplary method for determining a roll angle and a kink angle of a trailer by the trailer observation module 706 of FIG. 15 for determining a center of gravity of the trailer. At 802, the system determines if the trailer observation module is in a learn mode. When the trailer is in a learn mode, the processed information is stored as an initial trailer model (e.g., initial trailer model 412, or the like). When the trailer is not in learn mode, the system determines if a trailer is present within the processed data. When the trailer is not present within the processed data, the initial trailer model is purged from the trailer observation module. When the trailer is present within the processed data, the processed information is stored as a subsequent trailer model (e.g., subsequent trailer model 414, or the like). The subsequent trailer model is then compared with the initial trailer model to determine the roll angle and the kink angle of the trailer. The roll angle and the kink angle are transmitted to a control module for the vehicle, as described above.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term “non-transitory computer-readable media” is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., “software” and “firmware,” in a non-transitory computer-readable medium. As used herein, the terms “software” and “firmware” are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word “a” or “an” should be understood as not excluding plural elements or steps unless such exclusion is explicitly recited. Furthermore, references to “one embodiment” of the disclosure or an “exemplary” or “example” embodiment are not intended to be interpreted as excluding the existence of additional embodiments that also incorporate the recited features. Likewise, limitations associated with “one embodiment” or “an embodiment” should not be interpreted as limiting to all embodiments unless explicitly recited.

Disjunctive language such as the phrase “at least one of X, Y, or Z,” unless specifically stated otherwise, is generally intended, within the context presented, to disclose that an item, term, etc. may be either X, Y, or Z, or any combination thereof (e.g., X, Y, and/or Z). Likewise, conjunctive language such as the phrase “at least one of X, Y, and Z,” unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. A system for determining a center of gravity of a trailer, where the trailer comprises a front portion, a rear portion, and a first side and a second side extending between the front and rear portions, the system comprising:

one or more sensors associated with a vehicle, each of the one or more sensors having a field-of-view; and a processing device in communication with the one or more sensors, wherein the processing device is configured to execute instructions stored in a memory to perform operations, the operations comprising:

measuring a plurality of initial points along at least one of the first side and the second side of the trailer within the field-of-view of the one or more sensors;

generating an initial trailer model representative of the plurality of initial points;

after the plurality of initial points are measured, measuring a plurality of subsequent points along the at least one of the first side and the second side of the trailer within the field-of-view of the one or more sensors;

generating a subsequent trailer model representative of the plurality of subsequent points;

assessing the subsequent trailer model and the initial trailer model;

determining a roll angle and a kink angle of the trailer based on the assessment of the subsequent trailer model and the initial trailer model; and determining a center of gravity of the trailer based on the roll angle and the kink angle.

2. The system of claim 1, wherein the one or more sensors include at least one first sensor disposed on a first side of the vehicle and at least one second sensor disposed on a second side of the vehicle.

3. The system of claim 2, wherein measuring the plurality of initial points comprises:

measuring a first plurality of initial points along the first side of the trailer using the at least one first sensor; and measuring a second plurality of initial points along the second side of the trailer using the at least one second sensor.

4. The system of claim 3, wherein measuring the plurality of initial points further comprises aggregating the first plurality of initial points and the second plurality of initial points as the plurality of initial points.

5. The system of claim 4, wherein measuring the plurality of initial points along at least one side of the trailer within the field-of-view of the one or more sensors comprises detecting at least one patch removably attached to the at least one side of the trailer, wherein each patch is configured to improve reflection of a signal from the one or more sensors for detection of the plurality of initial points by the one or more sensors.

6. The system of claim 5, wherein measuring the plurality of subsequent points comprises:

measuring a first plurality of subsequent points along the first side of the trailer using the at least one first sensor; and measuring a second plurality of subsequent points on the second side of the trailer using the at least one second sensor.

7. The system of claim 6, wherein measuring the plurality of subsequent points comprises aggregating the first plurality of subsequent points and the second plurality of subsequent points as the plurality of plurality of subsequent points.

8. The system of claim 7, wherein measuring the plurality of subsequent points comprises detecting the at least one patch removably during measuring of the first plurality of subsequent points and the second plurality of subsequent points.

9. The system of claim 1, wherein the operations further comprise determining a likelihood of incident for the trailer based on the roll angle, the kink angle, and the center of gravity.

10. The system of claim 9, wherein the operations further comprise transmitting the roll angle, the kink angle, the center of gravity, and the likelihood of incident for the trailer to a vehicle control unit configured to regulate operation of the autonomous vehicle based on at least one of the roll angle, the kink angle, the center of gravity, and the likelihood of incident.

11. The system of claim 1, wherein measuring the plurality of initial points along at least one of the first side and the second side of the trailer within the field-of-view of the one or more sensors comprises measuring the plurality of initial points once the trailer is coupled to the vehicle.

12. The system of claim 1, wherein the operations further comprise:

initiating operation of the vehicle; and measuring the plurality of subsequent points along the at least one of the first side and the second side of the trailer during operation of the vehicle.

13. The system of claim 2, wherein the operations further comprise when the trailer is outside of the field-of-view of the first sensor and the second sensor, purging the trailer model.

14. A computer-implemented method for determining a center of gravity of a trailer, where the trailer comprises a front portion, a rear portion, and a first side and a second side extending between the front and rear portions, comprising:

executing instructions stored in a memory with a processing device in communication with the one or more sensors to perform operations comprising:

measuring a plurality of initial points along at least one of the first side and the second side of the trailer within a field-of-view of one or more sensors associated with a vehicle;

generating an initial trailer model representative of the plurality of initial points;

after the plurality of initial points are measured, measuring a plurality of subsequent points along the at least one of the first side and the second side of the trailer within the field-of-view of the one or more sensors;

generating a subsequent trailer model representative of the plurality of subsequent points;

assessing the subsequent trailer model and the initial trailer model;

determining a roll angle and a kink angle of the trailer based on the assessment of the subsequent trailer model and the initial trailer model; and determining a center of gravity of the trailer based on the roll angle and the kink angle.

15. The computer-implemented method of claim 14, wherein the one or more sensors include at least one first sensor disposed on a first side of the vehicle and at least one second sensor disposed on a second side of the vehicle.

16. The computer-implemented method of claim 15, wherein measuring the plurality of initial points comprises:

measuring a first plurality of initial points along the first side of the trailer using the at least one first sensor; and measuring a second plurality of initial points along the second side of the trailer using the at least one second sensor.

17. The computer-implemented method of claim 16, wherein measuring the plurality of subsequent points comprises:

measuring a first plurality of subsequent points along the first side of the trailer using the at least one first sensor; and measuring a second plurality of subsequent points on the second side of the trailer using the at least one second sensor.

18. The computer-implemented method of claim 17, wherein measuring the plurality of subsequent points comprises aggregating the first plurality of subsequent points and the second plurality of subsequent points as the plurality of plurality of subsequent points.

19. The computer-implemented method of claim 18, wherein measuring the plurality of initial points along at least one side of the trailer within the field-of-view of the one or more sensors comprises using at least one patch removably attached to the at least one side of the trailer, wherein each patch is configured to improve reflection of a signal from the one or more sensors for detection of the plurality of initial points by the one or more sensors.

20. The computer-implemented method of claim 14, wherein the operations further comprise determining a likelihood of incident for the trailer based on the roll angle, the kink angle, and the center of gravity.

* * * * *